United States Patent [19]

Suh

[11] Patent Number: 4,793,696

[45] Date of Patent: Dec. 27, 1988

[54] METHOD AND APPARATUS FOR RAPID FOCUS CONTROL IN AN OPTICAL DATA STORAGE DEVICE

[75] Inventor: Suk Y. Suh, Bridgewater, N.J.

[73] Assignee: Hoechst Celanese Corporation, Somerville, N.J.

[21] Appl. No.: 119,886

[22] Filed: Nov. 13, 1987

[51] Int. Cl.$^4$ ............................ G02B 5/10; G11B 5/09
[52] U.S. Cl. ..................................... 350/379; 350/370; 350/401; 350/608; 369/45
[58] Field of Search ............... 350/379, 370, 374, 400, 350/608, 401; 369/45

[56] References Cited

U.S. PATENT DOCUMENTS

| | | | |
|---|---|---|---|
| 1,525,550 | 2/1925 | Jenkins | 350/360 |
| 1,906,803 | 5/1933 | Mueller | 350/361 |
| 2,062,468 | 12/1936 | Matz | 88/61 |
| 2,403,915 | 7/1946 | Evans | 88/74 |
| 3,322,483 | 5/1967 | Jones | 350/295 |
| 4,124,273 | 11/1978 | Huignard et al. | 350/150 |
| 4,445,209 | 4/1984 | Mickleson et al. | 369/45 |
| 4,569,039 | 2/1986 | Okumura et al. | 369/44 |

OTHER PUBLICATIONS

Printed Publication "Optical Data Storage", The Optical Industry & Systems Purchasing Directory, Book 2, pp. E-144-148, 1983.

*Primary Examiner*—Bruce Y. Arnold
*Attorney, Agent, or Firm*—Burns, Doane, Swecker & Mathis

[57] ABSTRACT

There is provided a method of moving the position of the focal point of an optical system in an optical data storage device. A membrane reflector having an electrically controllable surface contour is provided in the optical system and the reflector's surface contour is controlled so as to move the focal point on the data storage medium of the optical data storage device. The optical system comprises a source of plane-polarized light, a polarizing beam splitter, first and second quarter-wave plates, the membrane reflector and an objective lens.

10 Claims, 2 Drawing Sheets

Fig. 1
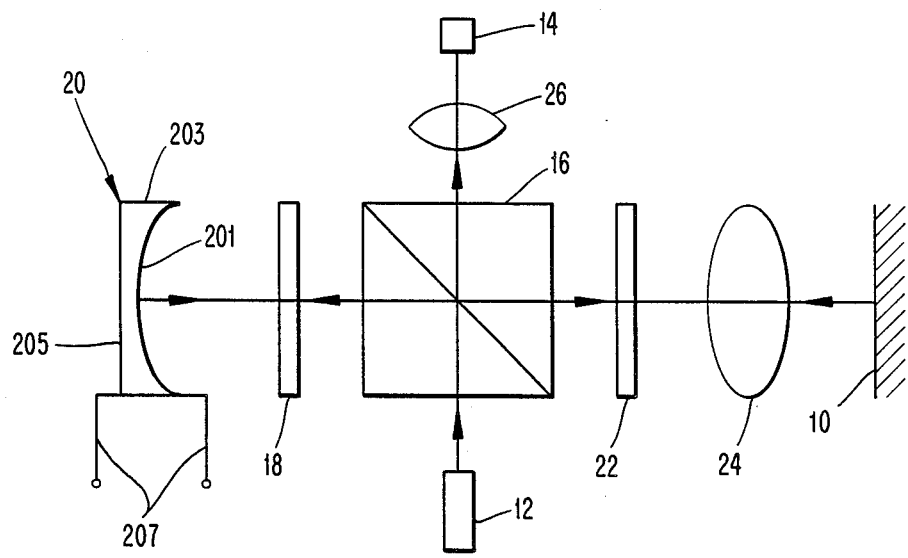
Fig. 2a
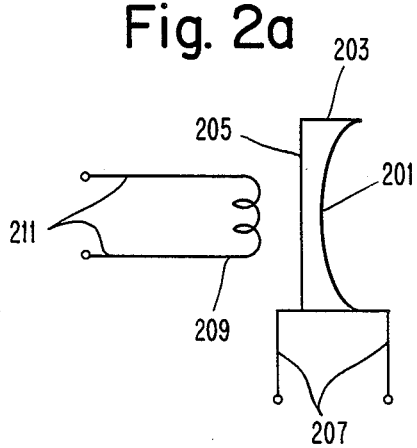
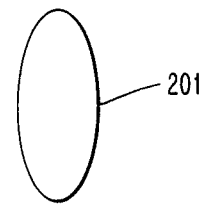
Fig. 2b
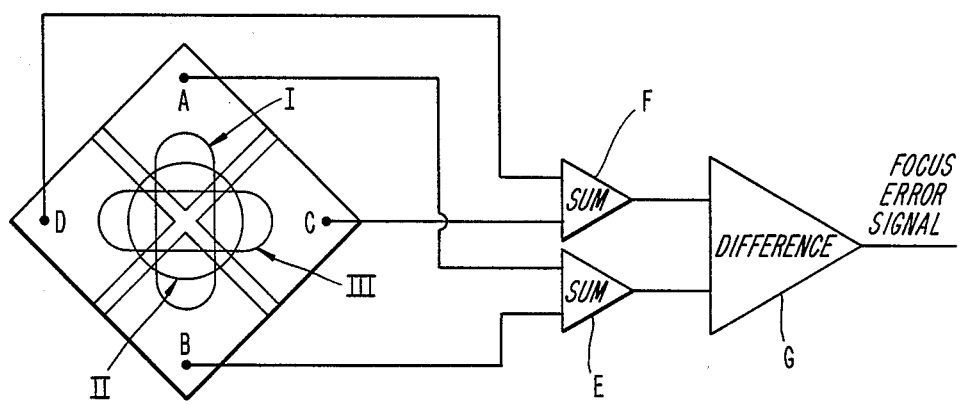
Fig. 3
(PRIOR ART)

METHOD AND APPARATUS FOR RAPID FOCUS CONTROL IN AN OPTICAL DATA STORAGE DEVICE

BACKGROUND

The present invention relates to optical digital data storage devices and to deformable membrane reflectors for use in the optical systems of those devices.

In a conventional optical data storage device, such as an audio compact disk (CD) player or an optical read-only memory (OROM), an objective lens focusses laser light onto the surface of an optical storage medium and collects light reflected from the medium. Other forms of conventional optical data storage devices employ secondary collecting lenses to collect laser light transmitted by the storage medium. The objective lens (and/or the secondary lens) is usually mounted on a voice-coil actuator so that the lens's longitudinal position relative to the storage medium, which is often a coated plastic disc, can be rapidly and accurately controlled. As data storage capacities increase, the performance requirements of the opto-mechanical systems of data storage devices become increasingly difficult to achieve. A device which has not previously been applied to the focus control problems of optical data storage devices is the deformable membrane reflector, the basic form of which has been described previously in several U.S. patents.

The patent to Jones, U.S. Pat. No. 3,322,483, discloses a metallized membrane which is electrostatically deformed into selectable surface profiles for use as an astronomical reflector. Spherical, elliptical and other shapes are obtained by varying the shape of an electrode or the nature of an electric signal applied to the electrode. The patent to Evans, U.S. Pat. No. 2,403,915, also discloses a metallized membrane which is deformed electrostatically into the shape of an opposed electrode. The shape of the reflector can be rapidly modulated and can assume other than a spherical profile.

The patent to Mueller, U.S. Pat. No. 1,906,803, and to Jenkins, U.S. Pat. No. 1,525,550, also disclose deformable mirrors which vary the focal position of ray bundles they reflect. Mueller causes the intensity of light passing a variably shaped beam-stop to be modulated by small deflections created by the deformable mirror. Jenkins varies the convergence characteristics of a light beam reflected from a mirror attached to a metal surface that is deformed by the influence of an electromagnet in a system for receiving pictures by radio.

None of these prior issued patents suggest the use of a membrane reflector in an optical data storage device, nor do they disclose mirrors which could be so used. The sizes and weights of the mirrors taught are impractically large for devices which today encompass a mere few tens of cubic centimeters.

Thus, it is an object of the present invention to provide a method of focus control which provides accurate and rapid adjustment of the optical system of an optical data storage device without requiring an excessively large volume. Other objects and advantages of the present invention will become apparent after a reading of the following detailed description and drawings.

SUMMARY OF THE DISCLOSURE

In accordance with the present invention, there is provided a method of moving the position of the focal point of an optical system in an optical data storage device. A membrane reflector having an electrically controllable surface contour is provided in the optical system and the reflector's surface contour is controlled so as to move the focal point on the data storage medium of the optical data storage device.

The method of the present invention embraces the provision of membrane reflectors having electrostatically controlled surface contours, as well as the servo-control of the surface contour. The method also embraces the movement of the focal point in directions perpendicular to and parallel to the surface of the recording medium. In addition, the method embraces the control of the membrane reflector's surface to form an anamorphic contour.

In accordance with the present invention, an optical system for an optical data storage device is provided, the optical system comprising a source of plane-polarized light, a polarizing beamsplitter which directs light emitted by the source according to the light's plane of polarization, a first quarter-wave plate which converts the light directed by the polarizing beamsplitter to circular polarization and vice versa, a membrane reflector which redirects the circularly polarized light from the first quarter-wave plate back to said plate, a second quarter-wave plate whose function is similar to the first quarter-wave plate, and an objective lens which focusses light transmitted by the second quarter-wave on to a recording medium.

The membrane reflector in the optical system can have an electrically or electrostatically controllable surface contour which can also be a stigmatic.

BRIEF DESCRIPTION OF THE DRAWINGS

Further objects and advantages of the present invention will become apparent from a reading of the following description in conjunction with the drawings in which:

FIG. 1 is a schematic diagram of an optical system of an optical data storage device in accordance with the present invention;

FIG. 2a is a side view of a schematic membrane reflector;

FIG. 2b is a front view of the reflective membrane; and

FIG. 3 shows a portion of a focus control servo system.

DETAILED DESCRIPTION

Referring to FIG. 1, there is shown schematically a cross-section of an optical system and an optical recording medium in an optical data storage device in accordance with the present invention. The recording medium 10 is illuminated by light emitted by a diode laser 12; light reflected from the medium 10 impinges on a photodetector 14. The path of the light is controlled by the optical system comprising a polarizing beam splitter 16, a first quarter-wave plate 18, a membrane reflector 20, a second quarter-wave plate 22, and an objective lens 24.

In general operation, light emitted by the diode laser 12 is reflected by the polarizing beam splitter 16 or transmitted by it according to the light's plane of polarization. Since the laser 12 typically emits substantially plane-polarized light, the laser 12 and splitter 16 are so oriented with respect to each other that the light emitted by the laser is reflected toward the first quarter-wave plate 18. The optical axis of the plate 18 is so oriented relative to the beam splitter that the light emitted by the laser 12 becomes a circularly polarized light beam. Quartz and mica are two well-known materials suitable for use as wave plates for the optical wavelengths commonly used in conventional data storage devices.

The light transmitted by the quarter-wave plate 18 is circularly polarized and is incident on a reflective surface 201 of the membrane reflector 20 which collimates it and reverses its direction of propagation. On passing through the first quarter-wave plate 18 a second time, the polarization of the beam is converted to plane polarization, but the light's plane of polarization is rotated by 90° so that the collimated light retransmitted by the plate 18 is again linearly polarized, but in the plane perpendicular to that of the light first emitted by the laser 12. As a result, the light reflected by the membrane reflector 20 and retransmitted by the first wave plate 18 is transmitted by the polarizing beam splitter 16 rather than being reflected back to the laser 12.

The light so transmitted by the beam splitter 16 is then incident on the second quarter-wave plate 22 which acts on it in the sam way as the first plate 18. The circularly polarized light transmitted by the second plate 18 is focussed by the objective lens 24 onto the optical recording medium 10.

Digital data is usually stored by the medium 10 in the form of pits in a recording layer of the medium 10. The presence or absence of a pit determines the reflectivity of the point on the medium illuminated by the light transmitted by the objective lens. Conventionally the medium 10 is longitudinally positioned with respect to the objective lens 24 so that the recording layer is in the focal plane of the objective lens 24.

Light reflected from the focal point on the medium 10 is collected and recolliminated by the objective lens 24. This still circularly polarized light then passes a second time through the second wave plate 22 which thus rotates its plane of polarization by 90° in the same way as the first plate 18. The light retransmitted by the second wave plate 22 is again linearly polarized in the same plane as it was when it was first emitted by the laser 12. As a result, this light is reflected by the polarizing beam splitter 16 and thus illuminates the photodetector 14. An optical system 26 may be used to concentrate the light reflected from the recording medium 10 on the photodetector 14 as well as to generate optical focus error signals necessary for the focus control servo-system.

The optical system illustrated in FIG. 1 differs in several respects from one which does not include a reflector such as the membrane reflector 20. In a conventional system, wave plate 18 and reflector 20 are absent and polarizing beam splitter 16 may be oriented with respect to the plane of polarization of laser 12 such that light emitted by the laser is reflected immediately toward waveplate 22. Light transmitted by wave plate 22 is circularly polarized and is focussed onto data storage medium 10 by objective lens 24. Light reflected from medium 10 is collected and collimated by lens 24 and retransmitted by waveplate 22. The retransmitted light is again linearly polarized but in the direction perpendicular to the light emitted by the laser. Accordingly, the light from the storage medium is transmitted by beam splitter 16. Photodetector 14 and focussing lens 26 are repositioned to collect and to detect the light reflected from storage medium 10. Of course it will be understood that beamsplitter 16 can also be oriented to transmit light from the laser toward the storage medium and thus reflect light reflected from the medium. Focussing lens 26 and photodetector 14 are positioned accordingly.

In practice, the performance of the several components of the data storage device is driven largely by efforts to increase the amount of data stored on the recording medium 10, to decrease the physical size of the data storage device, and to decrease access time of particular data on the disk. Currently available devices use coated plastic disk about 13 cm in diameter to store as much as 600 megabytes of binary information. The data is conventionally stored as the presence or absence of one-micrometer-diameter pits that are burned into the coating on the disk and are arranged in concentric or spiral tracks about 1.6 micrometers apart. It can be seen that the small size of the pits demands the use of a nearly diffraction-limited, large numerical aperture optical system. Indeed, as the pits are made smaller to increase the amount of data stored on the disk, the performance of the optical system becomes more critical, both as to the size of its focal spot and to the accuracy and speed with which the spot can be positioned on the disk. Naturally, this performance must be achieved with a system that is physically compact and light weight.

Important considerations in the use of an optical system having a large numerical aperture are its very shallow depth of focus and small focal spot diameter. As a result, the longitudinal position of the objective lens relative to the recording medium must be carefully controlled to avoid excessive degradation in the amount of light reflected from the disk. Also, the focal spot must be positioned on the center of the data track with similarly high accuracy for the same reason. Since the flatness of the disk and the concentricity of the data tracks and the axis of rotation of the disk are difficult to assure, the longitudinal and lateral positions of the objective lens are usually servo-controlled.

In a conventional optical data storage device, the objective lens 24 is mounted on a wire coil which is suspended in the magnetic field of a permanent magnet. Varying the amount of electric current in the coil can control the longitudinal position of the objective lens with the accuracy needed but only at the cost of requiring a relatively heavy coil-lens assembly. Also, each of the data tracks on the disk is accessed by controlling the current in another electromagnet which moves the coil-lens assembly laterally with respect to the surface of the disk. However, since the need to adjust the objective lens more precisely and more rapidly becomes more acute as data capacities increase, overcoming the effects of the inertia of the relatively heavy conventional coil-lens assembly becomes exceedingly difficult. In addition, the presence of electrical wires carrying power to the rapidly moving coil-lens assembly reduces the reliability of the data storage device.

In contrast, the membrane reflector used in the present invention can be very accurately controlled with high speed because only the very light reflective surface 201 needs to move. Thus, higher density data recording media can be used and the reliability of the data storage device can be improved.

As already noted, it is desirable to use an optical system having a large numerical aperture in an optical data storage device because of the higher data density usable on the recording medium. It will be appreciated that the numerical aperture of an optical system using a combination of elements can be larger than a system using a single element. For unit conjugate ratio, a single element having given focal length and usable aperture will form a focal spot having a diameter twice that of a combination of two elements which each have the given focal length and aperture. As a result, higher density data storage media can be used. Even for an application requiring a large conjugate ratio, for which single-element and combination optical systems have comparable focal spot diameters, a combination system will employ elements having usable apertures that can be smaller than that of a single element. As a result, the elements of the combination can be easier than the single element to manufacture. These advantages are provided by the combination optical system in accordance with the present invention.

A further advantage provided by use of a membrane reflector in the manner of the present invention is the reflector's ability to render the optical system substantially achromatic and thus able to use different lasers. The reflector 20 itself is inherently achromatic and, since its surface contour is dynamically adjustable, can be used to compensate the change in the position of the focal point which occurs due to the wavelength dispersion of the objective lens for lasers of differing emission wavelengths.

Referring to FIG. 2, there is shown in FIG. 2a a side view of an electrostatically controlled membrane reflector. The metallized and thus reflective membrane 201 is stretched in a convenient fashion across one end of an insulating cylinder 203. At the opposite end of the cylinder 203 is a conductive surface 205. A variable voltage can be imposed between the membrane 201 and the surface 205 through an attached pair of focus control actuator leads 207. It will be understood that by varying the voltage applied to the leads 207, the electrostatic attraction between the membrane 201 and the surface 205 is varied. Consequently, the surface contour of the membrane is also varied; since the membrane 201 is reflective, variation of its surface contour effectively varies the focal length of the membrane reflector 20 and the longitudinal or axial position of the focal point of the objective lens 24.

As disclosed by the above-cited patent to Jones, for a planar surface 205 and a circular cylinder 203, the resulting surface contour of the membrane 201 is substantially spherical when the separation and the voltage between the surface and the membrane are suitably chosen. It will be understood that the focal length of a spherical reflector is just one half of the reflector's radius of curvature and that the longitudinal position of the focal point of the combination optical system can be calculated in a well-known manner.

Of greater advantage in an optical storage device using a diode laser is a membrane reflector 20 which includes an elliptical cylinder 203. The reflective membrane 201 is therefore also elliptical, as shown in FIG. 2b, and results in an astigmatic optical element for a planar surface 205. Thus, the elliptical membrane reflector allows the compensation of the astigmatism typical of currently available, high power diode lasers.

This astigmatism arises, for example in a gain-guided diode laser, from the apparently different longitudinal positions of the virtual source in planes perpendicular and parallel to the direction of current flow through the diode laser. In the perpendicular direction, the source appears to be behind the output face of the diode, while in the parallel direction the source appears to be at the output face of the diode. By compensating the astigmatism of the diode laser, a smaller focal spot can be produced at the recording medium thereby allowing the use of higher data density. By appropriately selecting the lengths of the major and minor axes of the elliptical cylinder 203, the astigmatism of the diode laser beam can be corrected. Increased data storage density can thus be employed in the optical data storage device in accordance with the present invention.

Referring again to FIG. 1, focus control is carried out in the following manner with the membrane reflector 20. When the recording medium 10, after it has once been longitudinally positioned in the focal plane of the objective lens, moves out of the focal plane, e.g. farther from the objective lens 24, the voltage applied to the focus control actuator leads 207 is reduced. As a result, the surface contour of the reflective membrane 201 is changed in that its radius of curvature increases, thereby increasing the divergence of the light reflected. Thus, for a longitudinally fixed objective lens, the position of the focal point of the light moves longitudinally away from the objective lens. Similarly, if the recording medium moves toward the objective lens, the voltage applied to the focus control actuator leads is increased, thereby decreasing the radius of curvature of the membrane reflector and decreasing the divergence of the light reflected. As a result, the focal point of the light moves longitudinally toward the objective lens, compensating the movement of the recording medium.

The voltage applied to the focus control actuator leads 207 is readily derivable in a well-known manner using the focus servocontrol components of a conventional optical data storage device. Focus information can be obtained conventionally by imaging the light reflected from the recording medium onto a quadrant detector with a pair of cylindrical lenses. The quadrant detector used for obtaining focus information can simultaneously be used as the stored data detector 14, in which case the optical system 26 would be cylindrical. Alternatively a separate beam splitter, a pair of cylindrical lenses and quadrant detector can be provided, the separate beam splitter diverting a portion of the light reflected from the storage medium.

FIG. 3 shows a simple arrangement for deriving focus error signals using a quadrant detector and a pair of cylindrical lenses. The four elements A, B, C and D of the quad are each electrically connected to suitable amplifiers E and F which produce output signals corresponding to the sums $A+B$ and $C+D$, respectively. The sum signals in turn are connected to a difference amplifier G which generates an output signal $(C+D)-(A+B)$ corresponding to the focus error. Shown superimposed on the quad detector are images I, II, and III formed by the cylindrical lenses for different longitudinal positions of the storage medium. Image II, which is circular, corresponds to the in-focus position of the storage medium while images I and III are produced, for example, when the medium is behind and ahead of, respectively, the proper longitudinal position. It can be seen that when the medium is behind the in-focus position, the sum signal $A+B$ is greater than the sum signal $C+D$, thus the focus error signal output of amplifier G is negative. On the other hand, when the medium is ahead of the in-focus position, the sum signal $C+D$ is greater than the signal $A+B$, and the focus error signal is positive. As already described, the negative focus error signal can be suitably applied to the focus control actuator leads 207 of the membrane reflector 20 to increase the radius of curvature of the membrane 201, thereby effectively returning to the in-focus condition. Additional well-known electronic components are arranged to drive the focus-error voltage automatically and continuously toward zero, i.e., when C+D and A+B have the same magnitude. It will be understood that other arrangements of the focus servo system, which includes the combination of the cylindrical lenses and other types of lenses, total internal reflection prism, knife edge, skewed beam, quadrant detector, and bicell detector electronic circuits, etc. are also suitable.

In accordance with the present invention, using a membrane reflector instead of a voice coil actuator eliminates problems associated with the unavoidable inductive voltage kickbacks to the drive electronics produced by the voice coil. Thus, the servo system's electronics can be simpler and more robust with prolonged life and the servo can be designed for tighter, higher speed control of the focal point position.

Because the membrane reflector 20 is so much lighter than the conventional voice coil actuator, it is possible to access rapidly adjacent data tracks on the storage medium by tilting the membrane reflector. Accurate tilts can be generated, for example, by driving the reflector with a piezoelectric pusher, or with a galvanometer. Referring to FIG. 2a, a galvanometer coil 209 having leads 211 for a track access signal are shown. By suitably arranging the galvanometer and reflector, voltages applied to the leads 211 will quickly move the focal point laterally with respect to the storage medium.

It is, of course, possible to embody the invention in specific forms other than those of the above-described embodiment. This may be done without departing from the essence of the invention. The preferred embodiment is merely illustrative and should not be considered restrictive in any way. The scope of the invention is embodied in the appended claims rather than in the preceding description and all variations and changes which fall within the range of the claims are intended to be embraced therein.

What is claimed is:

1. In an optical data storage device having an optical storage medium and an optical system for focussing light to a focal point on the storage medium, a method of focus control comprising the steps of:

providing in the optical system a membrane reflector having an electrically controllable surface contour; and controlling the surface contour to move the focal point.

2. The method of claim 1 wherein the surface contour is controlled electrostatically.

3. The method of claim 1, wherein the surface contour is servo-controlled.

4. The method of claim 1, wherein the focal point is moved perpendicularly with respect to the recording medium.

5. The method of claim 1, wherein the focal point is moved laterally with respect to the recording medium.

6. The method of claim 1, wherein the surface contour is astigmatic.

7. In an optical data storage device, an optical system, comprising:

a source of plane-polarized light;

a polarizing beamsplitter which directs light emitted by the source according to the light's plane of polarization;

a first quarter-wave plate which converts the light directed by the polarizing beamsplitter to circular polarization;

a membrane reflector which redirects the circularly polarized light from the first quarter-wave plate back through said plate and to said polarizing beamsplitter;

a second quarter plate which transmits the light redirected through the first quarter-wave plate and to said beamsplitter; and an objective lens which focusses light transmitted by the second quarter-wave to a movable focal point.

8. The optical system of claim 7, wherein the membrane reflector has a electrically controllable surface contour.

9. The optical system of claim 7, wherein the membrane reflector has an electrostatically controllable surface contour.

10. The optical system of claim 7, wherein the membrane reflector has a surface contour which is astigmatic.

* * * * *